Inventor
Ernest M. Hommel
By Christy, Parmelee & Strickland
Attorneys

UNITED STATES PATENT OFFICE 2,569,472

APPARATUS AND METHOD FOR MANUFACTURING SILICATE FIBERS AND FRIT

Ernest M. Hommel, Pittsburgh, Pa., assignor to The O. Hommel Company, Pittsburgh, Pa., a corporation of Pennsylvania Application November 3, 1947, Serial No. 783,831

3 Claims. (Cl. 18—2.5)

This invention relates to the manufacture of fibers formed from glass or glass-like compounds generally referred to as silicates, and particularly to the manufacture of frit used in the preparation of fused enamels.

In the manufacture of frit as it is now generally carried out, the molten silicate or glass composition is run in a molten condition into water. The water chills it and cracks it. It is periodically removed from the water and subsequently ground to the finely divided form in which it is used.

Introduction of the molten glass into water results in the dissolving out to a limited extent of certain of the constituents of the frit, and no ingredients can be introduced into the frit which in the molten form will be readily leeched out or dissolved. Moreover, there are frequently impurities in the water, particularly iron compounds, which deposit a film on the frit that may result in discoloration. Often a very small amount of an impurity will produce a very pronounced effect in the enamel when it is eventually fired.

It has also been proposed to make silicate fibers, known in the trade as glass wool or mineral wool, from fused silicates. It is difficult with present methods of producing such fibers to form the threads or fibers of uniform diameter and to avoid the presence of small globules or nodules of glass.

The present invention, while especially applicable to the production of frit, also provides a new method of making glass fibers for use as mineral wool or glass wool which is used for insulating purposes. According to the present invention, the fused glass is drawn through a nozzle of an aspirator by the action of a current of high velocity air or other gas, and is discharged from the nozzle into the stream of air or other gas used to aspirate it. It is immediately converted into uniformly fine threads which solidify almost instantly.

Preferably the threads are carried by a moving stream of air or other gas against a continuously moving screen, whereby they are matted against the surface of the screen and are removed as a mat of substantially uniform thickness. This mat may then be cut into lengths or battens which are convenient for handling and storage, and which are also convenient for use as insulation. In the case of frit, the finely divided threads are subsequently pulverized. Since they are in a finely divided form, the amount of grinding required to reduce them to a pulverized state is substantially less than that required in the present frit grinding mills designed to crush large granules and chunks of glass. The operation is effected without contacting the glass with water, so that none of the compounds are leeched from the glass and the contaminating effects of impurities in the water are avoided.

My invention may be more fully understood by reference to the accompanying drawings, in which.

Figure 1:
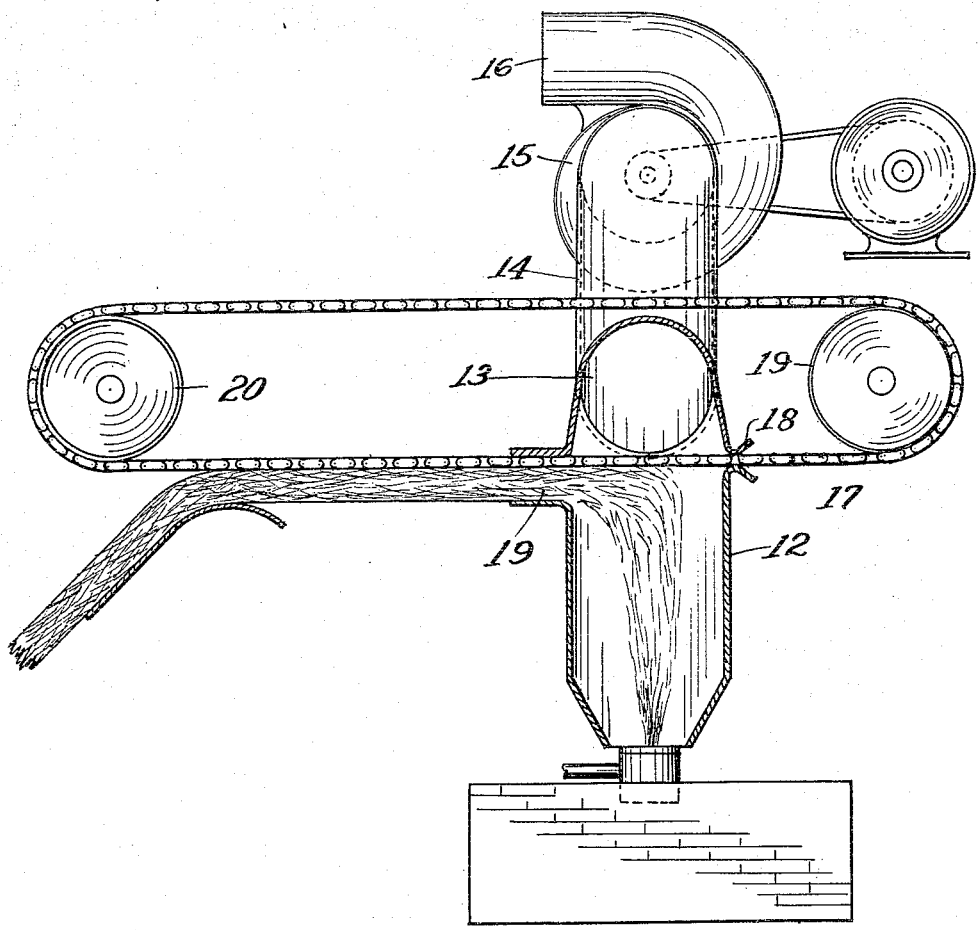
Fig. 1 illustrates one form of apparatus for converting the fused glass into a matted web of fibers of similarly uniform thickness.
Figure 2:
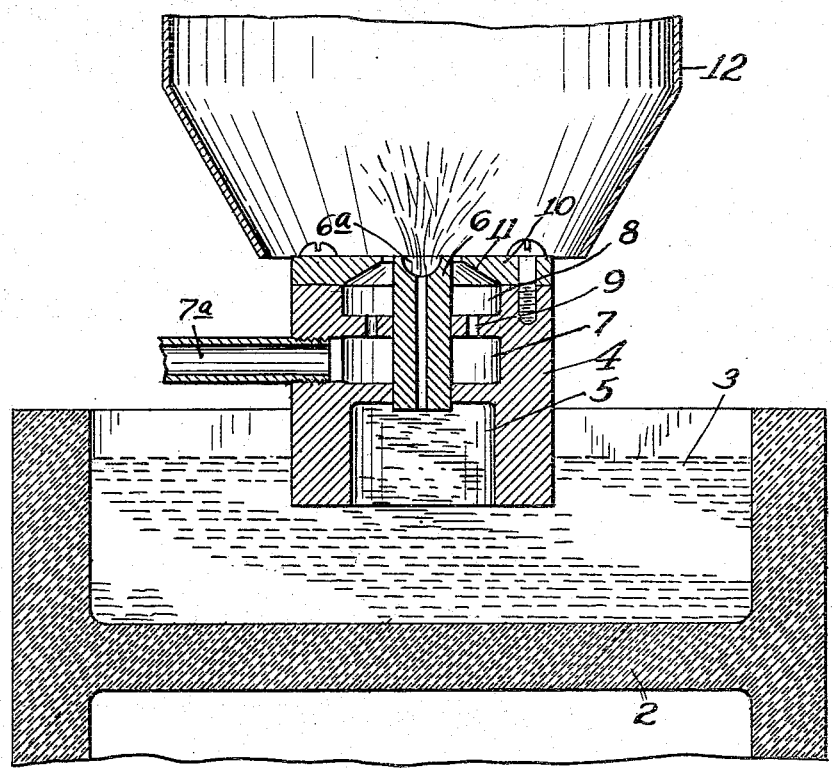
Fig. 2 represents a section through an aspirating device constructed to carry out my invention, the view being a transverse vertical section through the hearth of a melting furnace, and through the nozzle.

Referring first to Figs. 1 and 2 of the drawings, 2 designates the fore-hearth of a furnace adapted to contain in heated form, a fused body of glass or silicates of the type used in the manufacture of frits or in the manufacture of mineral wool. The hearth is made in such way that the glass may be kept heated, as is well understood in the art. Set down into the body of glass which is designated 3, is a body 4 having an upwardly opening chamber 5 therein. Extending axially from the chamber 5 is a tube 6 having a concave depression 6a in its upper end, this tube constituting the nozzle of an aspirator. In the body 4 above the chamber 5 is a second chamber 7 to which high pressure frit is supplied by means of a pipe 7a. Compressed air is preferably used. Above the chamber 7 there is still another chamber 8 which communicates with the chamber 7 through openings 9. Secured to the top of the body is a cover plate 10 having an overhanging lip portion 11 of inwardly reduced thickness, the edge of this lip terminating adjacent to the nozzle 6, but in spaced relation thereto, whereby to leave a small annular passage concentric about the tip of the nozzle. The tube 6 may be formed of metal or refractory, the latter material preferably being used, because, while it may erode, it will not detrimentally affect the frit.

Surrounding the nozzle and extending upwardly therefrom is a casing 12, and from the upper end of the casing 12 there is a horizontally offset passageway or offtake 13 which in turn leads to an uptake pipe 14 and a suction fan 15, the discharge of the suction fan being designated 16.

A link belt or other flexible screen 17 has one reach thereof passing across the upper part of the chamber within the casing 12, there being a restricted passageway 18 for the entering side of the chain or screen, and a wider outlet 19 for the emerging side of the screen. The upper reach of the chain or screen is above the offtake pipe 13, the offset provided by the pipe 13 being formed so that the upper reach of the chain does not have to pass back through the passageway between the chamber casing 12 and the fan 15. The endless screen or chain conveyor passes around the pulleys 19 and 20, one of which is driven from a suitable source of power not shown, at a predetermined regular speed.

In the operation of the invention, the suction fan 15 is operated to continuously draw air from the casing 12 up through the traveling screen. At the same time, air or other gas under pressure is supplied to the pipe 7a. As it emerges from the chamber 8 around the lip 11, it creates suction over the end of the nozzle, causing the molten glass 3 to be drawn up into the chamber 5 and up the passage through the nozzle. It is picked up at the end of this nozzle by the stream of air emerging from the annular opening around the nozzle and atomized into fine, thin threads. The threads are formed very rapidly and very uniformly. Augmented by the current of air created by the suction of the fan 15 with the air passing through the traveling chain or screen 17, the fibers are matted or packed against the screen, and as the screen travels at a uniform rate, a continuous mat or batten of fibers of substantially uniform thickness is formed, and carried out. At a point outside the chamber 12, this batten is stripped from the chain as indicated in Fig. 1 of the drawings.

Figure 3:
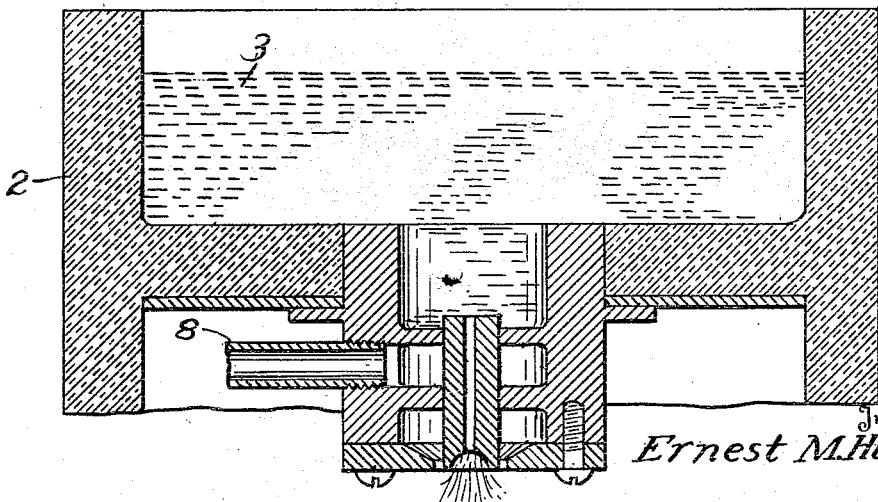
Fig. 3 is a view similar to Fig 2, but showing the nozzle at the bottom instead of the top of the hearth.

In some cases it may be desirable to have the nozzle directed downwardly instead of upwardly as in Fig. 2. Fig. 3 shows a modification in which the nozzle structure which is the same as that previously described, is introduced into the bottom of the fore-hearth and directed downwardly instead of extending upwardly. The same reference numerals have been used to indicate the same parts. As in 2, the nozzle will discharge into a casing similar to the casing 12, so that the fibers may be sucked downwardly into a traveling screen and be there matted.

The continuous batten or mat which is thus produced by either form of the invention is characterized by the threads being of fine and uniform diameters, and substantially free of glass beads or nodules. It may be cut up in lengths for suitable handling, or for use as insulation. In the case of frit, these battens may be thrown into the hopper of a grinding machine and the fibers quickly and rapidly reduced with a minimum of grinding, to the pulverized form required for frit. Aside from the rapidity and economy of grinding, the frit is superior by reason of being kept out of contact with water.

While I have illustrated and described one particular form of nozzle and apparatus for carrying out my invention, it will be understood that various modifications and changes may be made within the contemplation of my invention and under the scope of the following claims.

I claim:

1. The method of converting fluid glasseous materials into fibers which comprises drawing the molten glasseous material upwardly through a nozzle immersed in the molten glass material by an upwardly-flowing stream of air surrounding the nozzle to form the glass into vertically elongated fibers, aiding the upward movement of the fibers by suction means spaced above the nozzle, and depositing the fibers on a transverse screen spaced above the nozzle and below the suction means to form the fibers into a mat.

2. Apparatus for converting fused glass into fibers comprising a forehearth in which molten glass is maintained, a nozzle immersed in the glass and projecting from the forehearth normal to the plane of the forehearth, said nozzle having a cup-shaped terminal in the outermost end thereof, means for directing a stream of air in a direction generally axial of the nozzle annularly about the nozzle and with a generally non-swirling motion whereby the glass is drawn through the nozzle and drawn off the lip of the cup as fibers and carried in a substantially straight path away from the nozzle.

3. Apparatus for converting fused glass into fibers comprising a forehearth in which molten glass is maintained, a nozzle above the glass having its lower end extending down into the molten glass in the forehearth, said nozzle having a cup-shaped recess in its upper end, means for directing an upwardly-flowing stream of air annularly around the nozzle to entrain the glass at the lip of the cup and draw it into vertically elongated fibers, an enclosure about the nozzle, suction means above the nozzle for creating an upwardly-moving current of air in the enclosure to aid in the upward movement of the fibers, and a movable screen between the nozzle and the suction means for obstructing the upward movement of the fibers whereby they are caused to mat against the screen.

ERNEST M. HOMMEL.

REFERENCES CITED

The following references are of record in the file of this patent:

UNITED STATES PATENTS

| Number | Name | Date |
|---|---|---|
| 1,635,653 | Williams | July 12, 1927 |
| 1,859,992 | Seil | May 24, 1932 |
| 2,062,505 | Corkill | Dec. 1, 1936 |
| 2,127,116 | Heimburger | Aug. 16, 1938 |
| 2,156,316 | Slayter et al. | May 2, 1939 |
| 2,221,011 | Vieweg et al. | Nov. 12, 1940 |
| 2,235,352 | Bates | Mar. 18, 1941 |
| 2,317,895 | Drill | Apr. 27, 1943 |